May 26, 1942.   G. I. GOODWIN   2,284,278
CLUTCH PLATE
Filed Feb. 7, 1938

Inventor:
George I. Goodwin,
By Cromwell, Greist & Warden.
Attys.

Patented May 26, 1942

2,284,278

UNITED STATES PATENT OFFICE 2,284,278

CLUTCH PLATE

George I. Goodwin, Detroit, Mich.

Application February 7, 1938, Serial No. 189,035

5 Claims. (Cl. 192—68)

This invention has to do with clutch plates, and is particularly concerned with clutch plates of the spring center type, in which the outer portion of the plate is rotatable with respect to the inner portion through a small arc determined by stops against yielding resistance offered by springs.

The object of the present invention is to provide an improved clutch plate of this type which is strong, simple, durable and quite inexpensive to manufacture. The new plate is characterized by novelly constructed stops which act to limit the relative movement of the outer and inner portions of the plate to a small arc.

While the foregoing statements are indicative in a general way of the nature of the invention, other more specific objects and advantages will be evident to those skilled in the art upon a full understanding of the construction, arrangement and operation of the parts which have been combined to produce the new clutch plate.

A preferred embodiment of the invention is presented herein for the purpose of exemplification, but it will of course be appreciated that the invention is susceptible of embodiment in other structurally modified forms coming equally within the scope of the appended claims.

Figure 1:
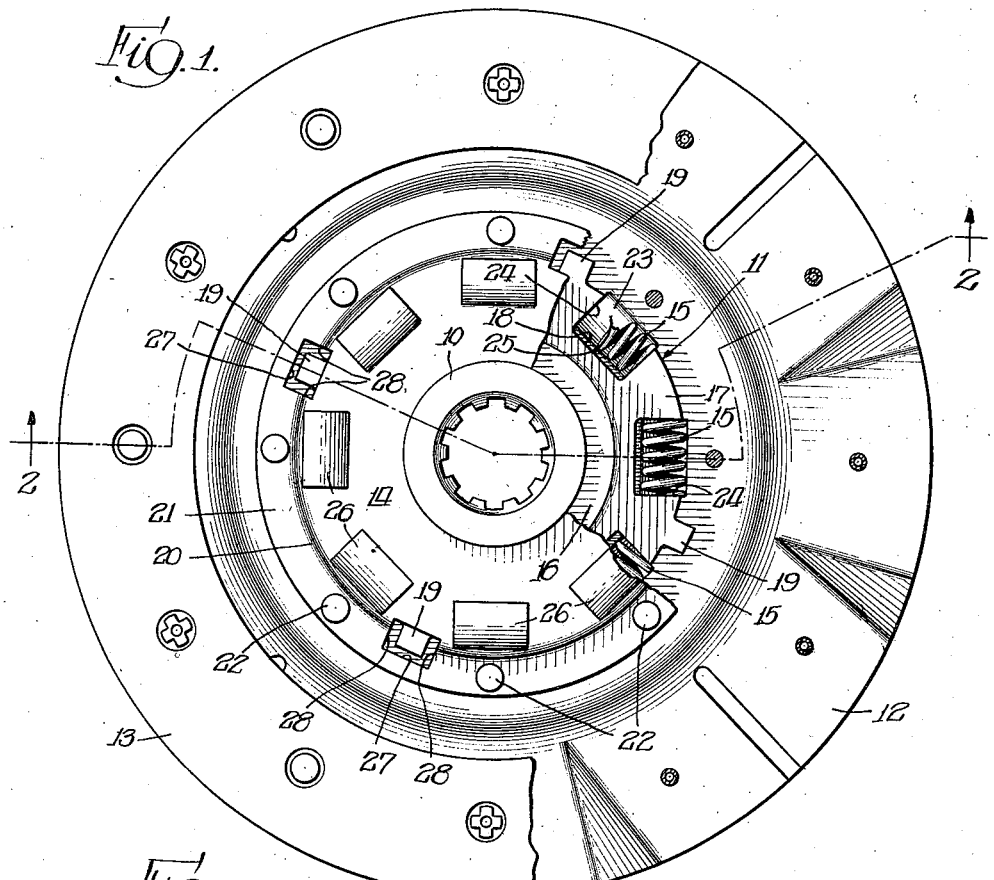
Fig. 1 is a face view of the improved plate, with certain of the parts broken away to reveal the inside construction.
Figure 2:
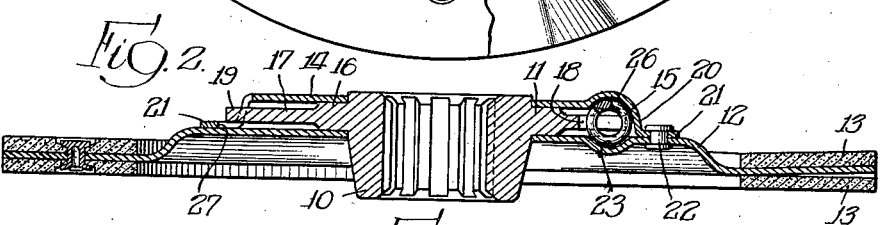
Fig. 2 is a section through the plate, taken on the irregular line 2—2 of Fig. 1.
Figure 3:
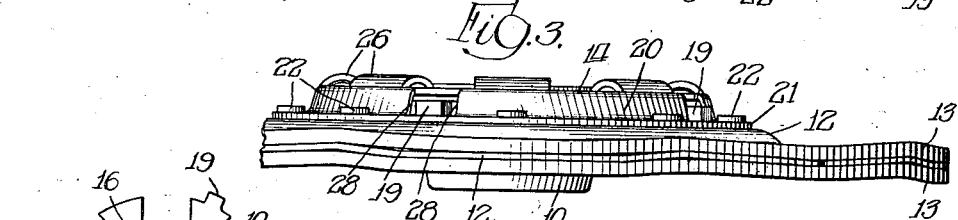
Fig. 3 is a fragmentary edge view of the plate.
Figure 4:
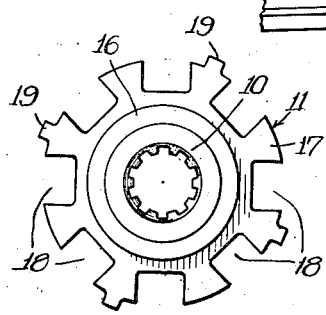
Fig. 4 is a face view of the hub, illustrating the spring slots in the flange of the hub and the stop lugs on the flange between certain of the spring slots.

The clutch plate shown in the drawing includes a hub 10 which is provided with a radial flange 11, a centrally apertured friction disk 12 which is undulated adjacent its periphery and equipped with suitable facings 13, a centrally apertured side plate 14, and a plurality of coil springs 15.

The hub 10 is interiorly splined for non-rotatable engagement with a correspondingly splined shaft on which it is adapted to be mounted. The flange 11 on the hub is characterized by a relatively thick inner portion 16 and a relatively thin outer portion 17. The thin outer portion 17 of the flange is provided with circumferentially spaced spring slots 18, and is also provided with radially projecting stop lugs 19 between certain of the spring slots.

The friction disk 12 and the side plate 14 are mounted on the hub 10 at opposite sides of the flange 11 in closely fitting engagement with the thick inner portion 16 of the flange. The outer portion 20 of the side plate 14 is cupped over the outer edge of the flange 11 and is provided outwardly of the cupped portion 20 with a narrow radial flange 21 which is positioned against and secured rigidly to the friction disk 12 by means of rivets 22.

The friction disk 12 is provided with circumferentially spaced spring pockets 23 which face the slots 18 in the flange 11 of the hub. These pockets are preferably formed in the friction disk by shearing the metal of the latter radially at the ends of the pockets and bulging or drawing the intervening metal out into substantially semi-cylindrical form. This construction results in straight cord-like edges 24 at the ends of the pockets for engagement with the flat ends of the springs 15, and intermediate side walls 25 for engagement with the sides of the springs.

Since the metal which is pressed outwardly to form the spring housings is not cut free from the body of the plate anywhere except at the ends, but is rather drawn or stretched in one direction to form the pockets, rigidity of structure is obtained, even with small gauge stock.

The side plate 14 is provided with a corresponding set of similarly constructed spring pockets 26 which likewise face the slots 18 in the flange 11 of the hub. The springs 15 are positioned in the slots 18 in the flange of the hub and in the complementary pockets 23 and 26 in the friction disk and side plate, where they serve to yieldingly resist rotational movement of the friction disk and side plate relative to the hub, in a manner well known in the art. As will be observed in the drawing, the cupped portion 20 of the side plate 14 confines the springs 15 in such manner as to prevent any outward movement of the latter, the arcuate shape of the cupped portion 20 at the outer side of each spring resulting in an integrally formed sheet metal retainer for each spring which conforms to the arcuate path of movement of either end of each spring.

At the locations of the stop lugs 19 on the flange 11 of the hub, the cupped portion 20 of the side plate is cut away to provide openings 27 for the accommodation of the lugs. These openings 27 are made quite a bit wider than the lugs 19, measured circumferentially of the unit, with the lugs centered in the openings when the pockets 23 and 26 are in exact register with the slots 18. By reason of this construction, the friction disk 12 and the side plate 14 are enabled to rotate a limited distance in either direction relative to the flange 11 on the hub against the yielding resistance offered by the springs 15, the lugs 19 bringing up against the ends 28 of the openings 27 to limit such rotational movement.

I claim:

1. A spring center clutch plate characterized by a hub having a radial flange provided with circumferentially spaced spring slots and radially projecting stop lugs between certain of the slots, a centrally apertured friction disk provided with circumferentially spaced spring pockets, clutch facings on the outer portion of the friction disk, a centrally apertured side plate provided with circumferentially spaced spring pockets, said friction disk and side plate being rotatably mounted on the hub against opposite sides of the flange and rigidly secured together outwardly of the flange, and said side plate being cupped about the outer edge of the flange and provided in the cupped portion thereof with radially disposed stop openings into which the stop lugs on the flange project, for limiting the rotary movement of the friction disk and side plate in either direction, and coil springs seated in the slots in the flange and in the pockets in the friction disk and side plate for yieldingly resisting the rotary movement.

2. A spring center clutch plate characterized by a hub having a radial flange provided with circumferentially spaced spring slots and radially projecting stop lugs between certain of the slots, a centrally apertured friction disk provided with circumferentially spaced spring slots, friction means on the outer portion of the friction disk, a centrally apertured side plate provided with circumferentially spaced spring slots, said friction disk and side plate being rotatably mounted on the hub against opposite sides of the flange and rigidly secured together outwardly of the flange, and one of the same being cupped about the outer edge of the flange and provided in the cupped portion thereof with radially disposed stop openings into which the stop lugs on the flange project, for limiting the rotary movement of the friction disk and said plate in either direction, and coil springs seated in the slots in the flange, friction disk and side plate for yieldingly resisting the rotary movement.

3. A spring center clutch plate characterized by a hub having a radial flange provided with circumferentially spaced spring slots, a centrally apertured sheet metal friction disk rotatably mounted on the hub at one side of the flange, friction means on the outer portion of the disk, a centrally apertured sheet metal side plate rotatably mounted on the hub at the other side of the flange, a connection between the outer portion of the side plate and the friction disk, and helical coil springs seated in the slots in the flange of the hub, said friction disk and side plate being slitted along lines in register with the ends of the springs and being pressed sidewise in opposite directions to provide radially continuous open-ended side pockets of uninterrupted arcuate cross section which conform to and support the sides of the springs with the ends of the springs exposed through the open ends of the pockets in abutment with the edges of the slits.

4. A spring center clutch plate characterized by a hub having a radial flange provided with circumferentially spaced spring slots, a centrally apertured sheet metal friction disk, friction means on the outer portion of the disk, a centrally apertured sheet metal side plate, said friction disk and side plate being rotatably mounted on the hub at opposite sides of the flange with one of said members cupped about the outer periphery of the flange into fixed engagement with the other member, and helical coil springs seated in the slots in the flange, said friction disk and side plate being slitted along lines in register with the ends of the springs and being pressed sidewise in opposite directions to provide radially continuous open-ended side pockets of uninterrupted arcuate cross section which conform to and support the sides of the springs with the ends of the latter exposed through the open ends of the pockets in abutment with the edges of the slits, the pockets in the cupped member being so constructed and arranged with respect to the circular cupped portion of the member as to utilize sections of the cupped portion as outer walls for the spring pockets.

5. In a clutch plate incorporating a torsionally cushioned drive, a hub member having a flange, a sheet metal plate member, a torsion cushion between the plate member and the flange, and integral projections on the flange extending in the plane of the latter into slots in the sheet metal plate member for limiting rotary movement of the plate member relative to the hub member, said slots being cut transversely in the sheet metal plate member in an annular portion of the latter in which the metal is disposed at a substantial angle to said projections, and said projections having radially disposed edges which engage squarely with the edges of the slots at right angles to the adjoining tangentially extending surfaces of the slotted annular portion of the plate member.

GEORGE I. GOODWIN.